United States Patent
Frick

(10) Patent No.: US 7,825,850 B2
(45) Date of Patent: Nov. 2, 2010

(54) METHOD FOR MEASURING THE MUZZLE VELOCITY OF A PROJECTILE OR THE LIKE

(75) Inventor: Henry Frick, Hettlingen (CH)

(73) Assignee: Oerlikon Contraves AG, Zurich (CH)

( * ) Notice: Subject to any disclaimer, the term of this patent is extended or adjusted under 35 U.S.C. 154(b) by 0 days.

(21) Appl. No.: 11/953,785

(22) Filed: Dec. 10, 2007

(65) Prior Publication Data

US 2008/0211710 A1 Sep. 4, 2008

Related U.S. Application Data

(60) Provisional application No. 60/968,883, filed on Aug. 29, 2007.

(30) Foreign Application Priority Data

Dec. 8, 2006 (DE) ........................ 10 2006 058 375

(51) Int. Cl.
 *G01S 13/58* (2006.01)
 *G01P 3/66* (2006.01)
 *G01S 13/00* (2006.01)
 *G01P 3/00* (2006.01)

(52) U.S. Cl. .................. 342/115; 73/167; 235/400; 324/76.11; 324/95; 324/160; 342/104; 342/105; 342/175; 342/195

(58) Field of Classification Search ......... 342/104–116, 342/165, 173–175, 195, 27, 28; 235/400–418; 89/1.11, 6, 6.5; 42/106; 324/160, 176–180, 324/76.11, 95; 73/167

See application file for complete search history.

(56) References Cited

U.S. PATENT DOCUMENTS

| | | | |
|---|---|---|---|
| 2,514,297 A | * | 7/1950 | Smith, Jr. et al. .............. 73/167 |
| 2,517,133 A | * | 8/1950 | Porter .......................... 73/167 |
| 2,691,761 A | | 10/1954 | Smith, Jr. |
| 2,755,439 A | * | 7/1956 | Whitmore ................... 324/176 |
| 2,824,284 A | | 2/1958 | Johnson |

(Continued)

FOREIGN PATENT DOCUMENTS

CH 691143 A5 4/2001

(Continued)

OTHER PUBLICATIONS http://people.ee.ethz.ch/~kkrohne/AMIV/Wellenleiter.pdf, pp. 24-33.

*Primary Examiner*—Bernarr E Gregory
(74) *Attorney, Agent, or Firm*—Muncy, Geissler, Olds & Lowe, PLLC

(57) ABSTRACT

It is proposed to use the gun barrel or launcher tube or the muzzle brake as a waveguide, which, however, is operated at a frequency that is below the cutoff frequency of the relevant waveguide mode. The transmit coupler excites the relevant waveguide mode. An oscillator generates the signal, which is then sent to the transmit coupler. The waveguide and the projectile form a system in which the electromagnetic field at the receive coupler is influenced by the position of the projectile. The characteristic change over time of the strength of the electromagnetic field at the location of the receive coupler that results from the change in the distance between the projectile and the receive coupler is measured and used to determine the muzzle velocity.

20 Claims, 2 Drawing Sheets

U.S. PATENT DOCUMENTS

| | | | | |
|---|---|---|---|---|
| 3,034,049 | A | * | 5/1962 | Downs ........................ 342/115 |
| 3,765,235 | A | * | 10/1973 | Morrow ........................ 73/167 |
| 4,030,097 | A | * | 6/1977 | Gedeon ........................ 342/115 |
| 4,283,989 | A | | 8/1981 | Toulios et al. |
| 4,837,718 | A | * | 6/1989 | Alon ........................ 342/104 |
| 4,928,523 | A | * | 5/1990 | Muhrer et al. ................ 73/167 |
| 5,157,402 | A | * | 10/1992 | Zagar et al. ................ 342/104 |
| 5,827,958 | A | * | 10/1998 | Sigler ........................ 73/167 |
| 6,644,111 | B2 | * | 11/2003 | Cytron et al. ................ 73/167 |
| 2005/0115316 | A1 | | 6/2005 | Giusti et al. |
| 2007/0074625 | A1 | | 4/2007 | Seidensticker et al. |

FOREIGN PATENT DOCUMENTS

| | | |
|---|---|---|
| DE | 10352047 A1 | 6/2005 |
| DE | 102005024179 A1 | 11/2006 |
| EP | 0023365 A2 | 2/1981 |
| EP | 0840087 A1 | 5/1998 |

\* cited by examiner

US 7,825,850 B2

METHOD FOR MEASURING THE MUZZLE VELOCITY OF A PROJECTILE OR THE LIKE

This nonprovisional application claims priority to German Patent Application No. DE 102006058375, which was filed in Germany on Dec. 8, 2006, and to U.S. Provisional Application No. 60/968,883, which was filed on Aug. 29, 2007, and which are both herein incorporated by reference.

BACKGROUND OF THE INVENTION

1. Field of the Invention

The present invention relates to a method for measuring a Muzzle Velocity of a projectile or the like.

2. Description of the Background Art

Prior art measurement devices and methods use at least one coil pair, which as a rule is located following a muzzle brake of a weapon. The coils here are positioned at a defined distance from one another, wherein the velocity $V_0$ is determined by the measured time the projectile requires to travel the distance defined by the coils.

Such a device is known from CH 691 143 A5. In order to measure the shell velocity of a rapid-firing gun, two sensors are arranged at a distance from one another on a support tube at the muzzle of a gun barrel. These sensors, which respond to changes in a magnetic flux, stand in connection with an analysis electronics unit and have a coil pair consisting of two coils and a closed magnetic circuit. The measured shell velocity, or the fuze timing updated thereby, is then generally communicated to the shell as information before the shell exits the muzzle area.

DE 697 09 291 T2 (EP 0 840 087 B1), which corresponds to U.S. Pat. No. 6,032,568, discloses a means for controlling the initial velocity of a shell. in this context, sensor means are provided that can measure a parameter related to the muzzle velocity. This takes place with the aid of the sensors, located at least in or on the gun muzzle, which can measure an increased pressure in the gun muzzle that arises as a result of the heating of the propellant gases at the gun barrel. Proposed as sensors are strain gauges that are adapted such that they are in contact with the gun muzzle. The expansion of the gun muzzle is measured here. The motion of the projectile and, thus its velocity, is determined from the time difference in detection of the projectile passage by the two individual sensors.

DE 103 52 047 A1, which corresponds to U.S. Publication No. 2005115316, proposes integrating at least two sensors that are spaced apart from one another on or directly in the gun barrel. As the shell passes through, the sensors experience an expansion due to the gas pressure at the shell base; this expansion is converted into an electrical signal and is delivered to a subsequent signal processing unit, after amplification if necessary. Preferably, quartz sensors in the form of length measuring pins are used, which are located either in a support ring on or around the gun barrel, or are located directly in the gun barrel. The quartz sensors have the great advantage that they can convert even the smallest pressure changes into signals, are themselves very robust, and can be integrated with precise fit, i.e. in firm, slip-proof contact with the gun barrel. Consequently, mechanical loads on the gun barrel have no effect on the measurement result of the indirect pressure measurement. Moreover, the sensors are not directly exposed to the gas pressure and are built into a solid structure that is additional to the existing housing.

In contrast, DE 10 2005 024 179 A1, which corresponds to U.S. Publication No. 2007074625, substantially avoids a direct measurement of the current muzzle velocity, since the real muzzle velocity is determined from information about the current flight velocity of the shell, i.e. is calculated back therefrom. The detonation time of the shell is then corrected on the basis of this current shell velocity with the aid of a detonation time preset for a default muzzle velocity, and is used as the current fuze timing. A microwave transmitter, preferably in the GHz range, is used to transmit this information to the shell; said transmitter transmits the current time setting, determined for example by a fire-control computer, to the shell or munition.

Another method is to operate the barrel as a circular waveguide and to measure the Doppler velocity of the projectile in the barrel, as can be read from EP 0 023 365 A2, which corresponds to U.S. Pat. No. 4,283,989. The frequency of the signal here is above the cutoff frequency of the waveguide mode in question. The electromagnetic wave that builds up in this case propagates in the barrel and is reflected from the projectile. In addition, there is a Doppler frequency shift that depends on the instantaneous velocity.

It is disadvantageous in this regard that two sensors must be arranged at a defined spacing. This design increases the length of the measurement device at the muzzle of the gun barrel. This can lead to instability of the entire weapon or cause problems when using subcaliber ammunition. The sabots that detach upon emergence from the gun barrel can damage the measurement device. Moreover, the sensors must be fastened directly in or on the gun barrel. In many cases, the supplier of the gun barrel and the supplier of the muzzle velocity measurement device are not the same. This has the result that mounting the sensors on or in the barrel is possible only under difficult conditions, or is even impossible. A muzzle velocity measurement device should function independently of the gun barrel used, without interfering with the gun barrel itself. Another disadvantage results from the fact that the measurements of the flight velocity and the programming of the detonation time outside the gun barrel by means of a microwave transmitter require a certain resistance to interference for the transmission of information between transmitter and shell. Interference from natural sources, as well as intentional interference from a jammer, can impede the measurement of the flight speed and the subsequent programming or even make it impossible. Moreover, modern "electronic warfare" methods can be used to detect the emissions of the transmitter by external methods and locate the position of the gun. The position of the gun is thus known to the enemy, who will initiate countermeasures to attack the gun. The maxim today is "See but remain unseen." If the gun reveals its position by emissions, that gun is in great danger from efficient weapons systems. Moreover, certain requirements are placed on the stability of the oscillator in measuring the Doppler frequency shift. Vibrations arising from firing can change the instantaneous frequency of the transmitter and increase the effort required to accurately measure the frequency shift. Furthermore, the gun barrel acts as an open circular waveguide and can act as an antenna. This means that an external eavesdropping device can detect the emissions and determine the position of the gun.

SUMMARY OF THE INVENTION

It is therefore an object of the present invention to provide a measurement of muzzle velocity that is likewise non-contacting and that does not exhibit the latter defects.

The invention is based on the idea of similarly using the gun barrel or launcher tube and/or parts of the muzzle brake as a waveguide (a waveguide is a tube with a characteristic cross-section and a wall that is a very good electrical conductor; square and round waveguides enjoy especially wide technical use), but which is operated below the cutoff frequency of the relevant waveguide mode. In a waveguide that is operated in such a manner, no electromagnetic wave can propagate, and thus no energy transport along the waveguide can take place. The electromagnetic field decreases exponentially in the direction of the waveguide; this results from the solution to Maxwell's equations rather than as a result of ohmic damping.

In this context, the electromagnetic field must satisfy the boundary condition for a circular waveguide and the boundary condition at the projectile. It should be noted here that the circular waveguide need not necessarily have an exactly circular cross-section. Rather, it is also possible to build a profile into the wall of the waveguide in order to achieve a desired transverse electromagnetic field distribution. This can be seen in FIG. 3, where a rib structure in the muzzle brake provides for mode selection. When all boundary conditions are met, the result is a signal strength at the location $z=0$ (when $Z_K=0$) that is now determined by the position $z=z_P$ of the projectile in the waveguide. The offset $Z_K$ between the transmit coupler (3.1) and the receive coupler (3.2) can be used for better mode selection if needed. In general, however, it should be the case that $Z_K=0$, and applies only for the receive coupler that is closest to the transmit coupler (3.1). The situation depicted in FIG. 3 shows an arrangement consisting of one transmit coupler (3.1) and one receive coupler (3.2). However, as shown in FIG. 4, multiple receive couplers (4.2) can also be placed in series very close together and thus compactly toward the barrel end and ahead of the transmit coupler (4.1) in order to improve measurement accuracy. The muzzle brake is not artificially lengthened here, and thus the disadvantage of a long muzzle velocity measurement device is avoided.

The measurement device is made up of the gun barrel or other tubular launching apparatus, the projectile, the muzzle region of the barrel, for example a muzzle brake, and at least one oscillator, a transmit coupler and a minimum of one receive coupler or multiple receive couplers, with the number depending on the desired measurement accuracy of the measurement device.

The advantage of this simple measurement device is that the muzzle region or the muzzle brake need not be artificially extended. The measurement device is integrated directly into the muzzle brake. Moreover, it can be used independently of the type of ammunition (full or subcaliber). The measurement device is compact, since the barrel and the muzzle region, in particular the muzzle brake that is generally used on the gun barrel, also constitute part of the measurement setup. The accuracy of the measurement itself is independent of the oscillator frequency, so that a high degree of frequency stability for the oscillator is not required as in prior art Doppler frequency measurements. It is only necessary to avoid exceeding an upper frequency or dropping below a lower frequency. Moreover, the simple measurement results from the fact that the envelope is detected instead of the frequency. The measurement device can be used in single-mode operation.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
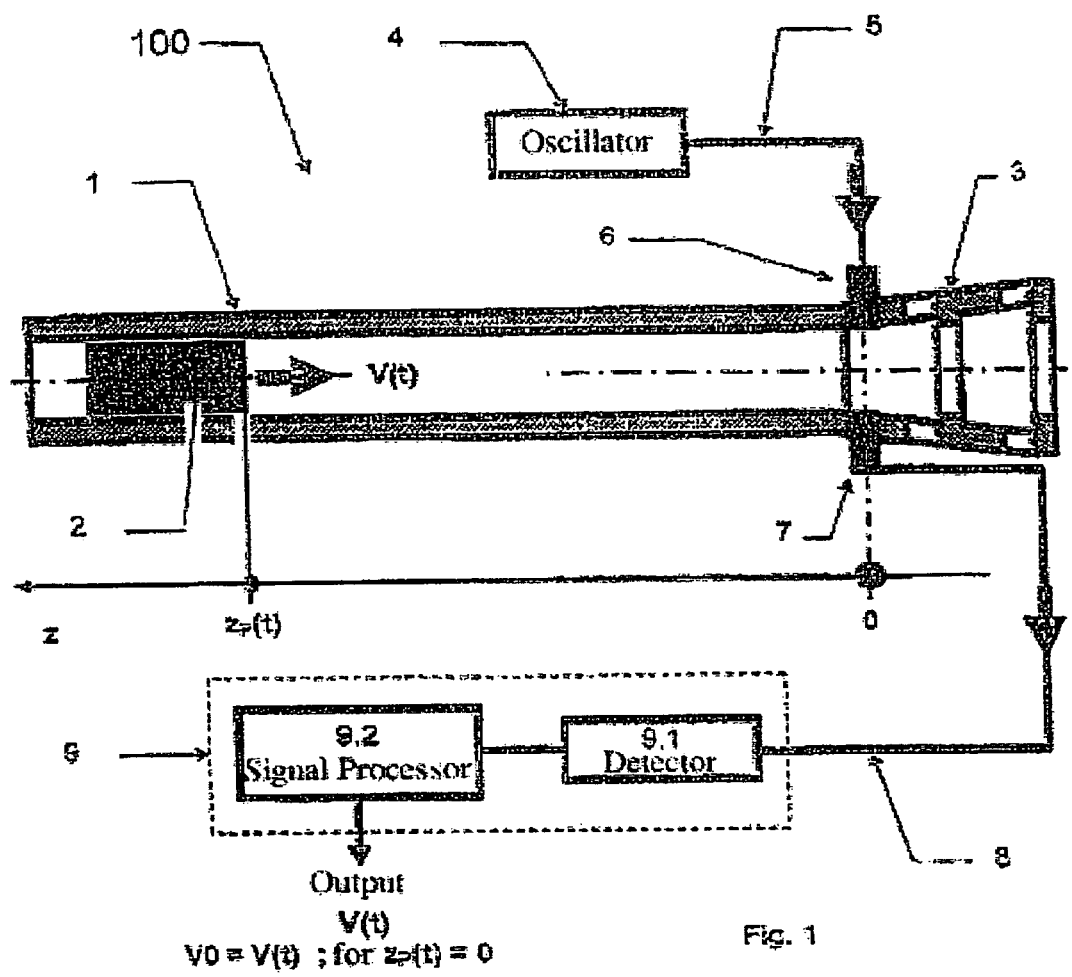
FIG. 1 illustrates a basic measurement device for measuring the muzzle velocity of a projectile.
Figure 2:
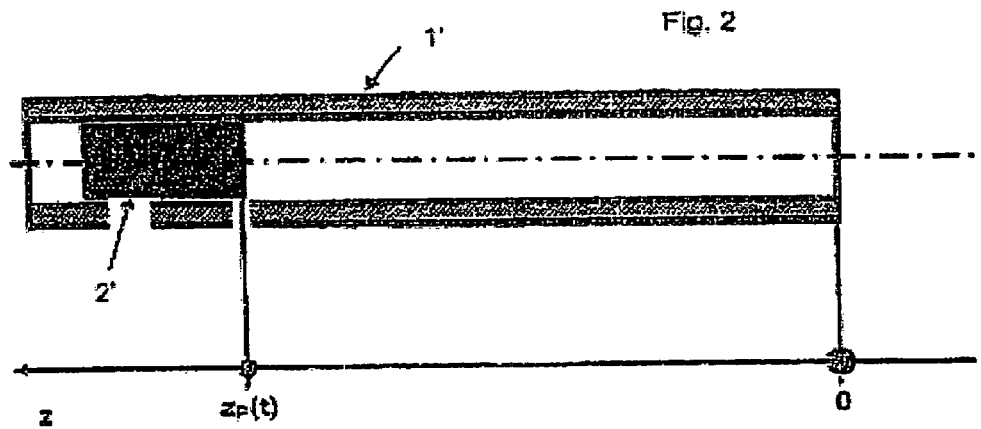
FIG. 2 illustrates a schematic representation of the limited circular waveguide from FIG. 1.

FIGS. 1 and 2 show the basic structure of a measurement device 100 for the measurement method. The measurement device 100 includes a gun barrel 1, here with a muzzle brake 3, an oscillator 4 that is electrically connected through a signal line 5 to a transmit coupler 6 for excitation. A receive coupler 7 is used for signal acquisition and is connected by a cable 8 for the received signal to the receiving unit 9, consisting of a detector 9.1 and a signal processor 9.2. The two couplers 6, 7 are integrated into the muzzle brake 3 and form a coupler pair.

The oscillator 4 here excites a waveguide mode (TE; TM) through the transmit coupler 6. In this regard, provision is made in this example embodiment that a frequency is selected that is below the cutoff frequency of the relevant waveguide mode. The desired waveguide mode is excited by mechanical and electromagnetic mode selection. The system of the "barrel" 1 (FIG. 2, waveguide 1') and the projectile 2 (FIG. 2, cylinder 2') results in the signal strength at the location $z=0$ which is determined by the position $z=z_P$ of the projectile 2. The receive coupler 7, here a pickup sensor, acquires this signal, which is conducted to the receive unit 9.

As already discussed, the measurement device 100 is operated in a selected waveguide mode below the cutoff frequency of this waveguide mode of the waveguide or of a section of waveguide that is integrated into the muzzle brake. Not only the fundamental mode, but also higher waveguide modes are possible. A distinction is drawn between transverse electrical (TE) and transverse magnetic (TM) modes. Both modes can also be used here.

The basic principle of the measurement method is examined in somewhat greater detail with the aid of FIG. 2. When the circular waveguide 1' is bounded by the cylindrical plug 2', the electromagnetic field must satisfy the boundary conditions at the waveguide walls as well as the boundary conditions at the cylinder base. Ideally, the walls and the cylinder base are both conductive. This means that the tangential component of the electrical field strength is "E=0 V/m" (zero), and that the normal component of the magnetic induction at these surfaces is "B=0 T" (zero). This can be accomplished by introducing two field components: the original electromagnetic field that satisfies only the boundary conditions at the walls, and an additional component that possesses the same transverse distribution as the original field and that thus also satisfies the boundary conditions at the walls. The original field component is excited at the location $z=0$. The frequency is below the cutoff frequency for the selected waveguide mode. In order to satisfy the boundary conditions at the cylinder base $z=z_P$, a second field component is created that, by superposition, cancels the tangential component of the electric field strength and the normal component of the magnetic induction of the original field. The superposition of the two components results in a signal strength at the location $z=0$ that depends on the position of the cylinder base at the location $z=z_P$.

If the time behavior of the signal strength at the location $z=0$ is now analyzed, conclusions can also be drawn concerning a muzzle velocity $V_0$.

Figure 3:
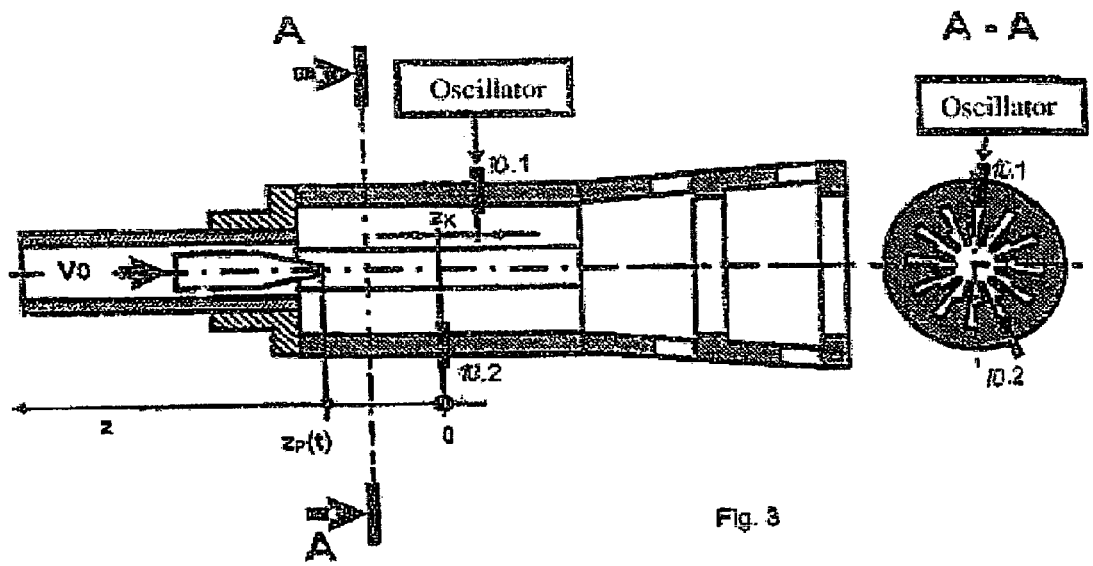
FIG. 3 is a representation of the measurement section integrated into the muzzle brake and equipped with a rib structure for mode selection.

As can be seen from FIG. 3, the selected waveguide mode can be excited by mechanical design measures, for example with a rib structure at the waveguide wall here. Moreover, the mode selection is reinforced by the manner of excitation using the transmit coupler 10.1. FIG. 3 shows the waveguide as part of the muzzle brake. The offset $V_K$ between transmit coupler 10.1 and receive coupler 10.2 can serve the purpose of improved mode selection if necessary. In general, however, it should be the case that ZK=0, which applies only to the receive coupler that is closest to the transmit coupler 10.1.

Figure 4:
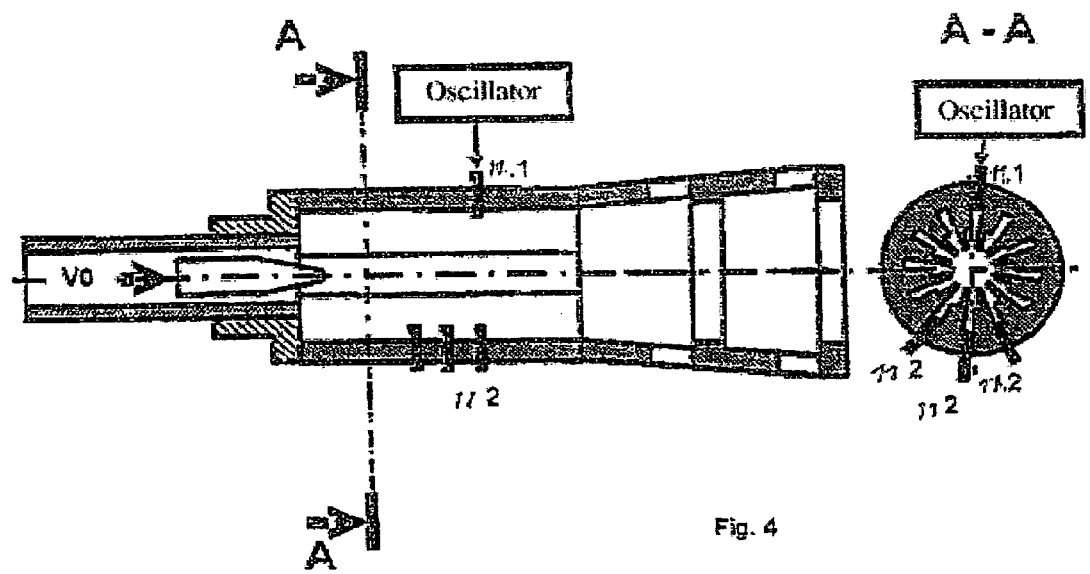
FIG. 4 is a representation from FIG. 3 with multiple couplers.

FIG. 4 shows how the measurement accuracy is improved with multiple receive couplers 11.2. It should be noted that the receive coupler 11.2 that is farthest from the barrel end is at the same distance from the barrel end as the transmit coupler 11.1. This means that no receive couplers 11.2 are to be positioned beyond the transmit coupler 11.1.

The defects of the prior art methods are overcome by the measurement device proposed here through the following features: the couplers (transmit coupler and receive coupler) are positioned very close to one another and thus are integrated into the muzzle brake (3). No extension of the muzzle brake is necessary. Moreover, the couplers can also be installed in the barrel when this is possible; the measurement device is only integrated in the muzzle brake (FIG. 3) if it cannot be integrated into the gun barrel. The measurement device is thus independent of the barrel and thus also of the supplier of the barrel; the measurement takes place within the muzzle brake or barrel, thus achieving increased resistance to interference; the waveguide is operated below the cutoff frequency, and emissions to the outside are also minimized by the length of the waveguide; no stringent frequency stability requirements are placed on the oscillator, since no Doppler frequency measurement is needed.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for determining a muzzle velocity of a projectile at a gun barrel or launcher tube or at a muzzle brake, the method comprising:
   operating the barrel or muzzle brake as a waveguide at a frequency that is below a corresponding cutoff frequency characterizing signal propagation in the waveguide, the cutoff frequency indicating a frequency below which waves are attenuated rather than propagated through the waveguide; and
   determining the muzzle velocity of the projectile from measurements of an electromagnetic signal generated in response to the operation of the waveguide.

2. The method according to claim 1, wherein an instantaneous projectile velocity is continuously determined and stored.

3. The method according to claim 1, wherein changes in the projectile velocity in the waveguide are determined over time.

4. The method according to claim 1, wherein determining the muzzle velocity of the projectile comprises predicting the velocity while the projectile moves through the waveguide and before the projectile exits the waveguide.

5. The method according to claim 1, wherein a point in time of the determination is chosen as that point in time when the projectile is located at the location of a receive coupler, wherein the signal to be measured becomes zero or has another characteristic behavior providing a boundary condition for determining the velocity.

6. A determining device for carrying out the method according to one of claims 1 through 5, the determining device comprising:
   a gun barrel or launcher tube;
   a muzzle brake;
   a signal generator, which is electrically connected through a signal line to at least one transmit coupler for exciting the gun barrel or launcher tube; and
   a receive line for conducting the measured signals of at least one receive coupler to an analysis unit.

7. The determining device according to claim 6, wherein the signal generator generates a carrier wave having a constant amplitude and frequency.

8. The determining device according to claim 6, wherein the signal generator generates a modulated signal.

9. The determining device according to claim 6, wherein the signal generator is an oscillator.

10. A muzzle velocity measurement apparatus, comprising:
    at least one transmit coupler configured to excite a waveguide at a given frequency;
    at least one receive coupler configured to receive electromagnetic signals generated in response to the excitation of the waveguide;
    a measurement unit configured to determine a velocity of a projectile launched through the waveguide based on the electromagnetic signals received by receive coupler; and
    a signal generator configured to provide an electromagnetic signal for exciting the waveguide to the transmit coupler at a frequency below a cutoff frequency corresponding to the waveguide, the cutoff frequency indicating a frequency below which waves are attenuated rather than propagated through the waveguide.

11. The apparatus of claim 10, wherein the waveguide is formed from at least a portion of a gun barrel or launcher tube.

12. The apparatus of claim 10, wherein the waveguide is formed from at least a portion of a muzzle brake.

13. The apparatus of claim 10, wherein the velocity of the projectile is determined by measuring strengths of the electromagnetic signals received by receive coupler over time along a path of the projectile through the waveguide.

14. The apparatus of claim 13, wherein the velocity of the projectile is determined at one or more points along the path of the projectile.

15. The apparatus of claim 14, wherein the one or more points along the path of the projectile includes a point where the projectile exits the waveguide.

16. The apparatus of claim 14, wherein the one or more points along the path of the projectile includes at least one point before where the projectile exits the waveguide.

17. The apparatus of claim 10, wherein the signal generator is an oscillator.

18. The apparatus of claim 10, wherein the transmit coupler and receive coupler are offset from each other along a longitudinal axis of the waveguide.

19. The apparatus of claim 10, wherein the receive couplers are spaced a fixed distance apart from each other along a longitudinal axis of the waveguide.

20. A method for measuring muzzle velocity, comprising:

exciting a waveguide at a given frequency;

receiving electromagnetic signals generated in response to the excitation of the waveguide;

determining a velocity of a projectile launched through the waveguide based on the electromagnetic signals received in response to the excitation of the waveguide; and providing an electromagnetic signal for exciting the waveguide at a frequency below a cutoff frequency corresponding to the waveguide, the cutoff frequency indicating a frequency below which waves are attenuated rather than propagated through the waveguide.

* * * * *